(No Model.) 6 Sheets—Sheet 1.
A. KALINSKI, E. CRIPPEN & M. T. CASHEN.
COMBINED WATER TOWER, EXTENSION LADDER, AND FIRE ESCAPE.

No. 387,887. Patented Aug. 14, 1888.

WITNESSES:
W. R. Davis
C. Sedgwick

INVENTOR:
A. Kalinski,
E. Crippen,
BY M. T. Cashen.
Munn & Co.
ATTORNEYS.

(No Model.) 6 Sheets—Sheet 5.

A. KALINSKI, E. CRIPPEN & M. T. CASHEN.
COMBINED WATER TOWER, EXTENSION LADDER, AND FIRE ESCAPE.

No. 387,887. Patented Aug. 14, 1888.

WITNESSES:
N. R. Davis
C. Sedgwick

INVENTOR:
A. Kalinski
E. Crippen
M. T. Cashen
BY Munn & Co.
ATTORNEYS.

(No Model.) 6 Sheets—Sheet 6.

A. KALINSKI, E. CRIPPEN & M. T. CASHEN.
COMBINED WATER TOWER, EXTENSION LADDER, AND FIRE ESCAPE.

No. 387,887. Patented Aug. 14, 1888.

WITNESSES:
W. R. Davis.
E. Sedgwick.

INVENTOR
A. Kalinski,
E. Crippen,
BY M. T. Cashen.
Munn
ATTORNEY

UNITED STATES PATENT OFFICE.

ACHILLES KALINSKI, EDWIN CRIPPEN, AND MARCUS T. CASHEN, OF NEW ORLEANS, LOUISIANA, ASSIGNORS TO SAID KALINSKI AND CRIPPEN, AND JOSEPH SCHWARTZ, OF SAME PLACE.

COMBINED WATER-TOWER, EXTENSION-LADDER, AND FIRE-ESCAPE.

SPECIFICATION forming part of Letters Patent No. 387,887, dated August 14, 1888.

Application filed March 17, 1888. Serial No. 267,487. (No model.)

*To all whom it may concern:*

Be it known that we, ACHILLES KALINSKI, EDWIN CRIPPEN, and MARCUS T. CASHEN, all of New Orleans, in the parish of Orleans and State of Louisiana, have invented a new and Improved Combined Water-Tower, Extension-Ladder, and Fire-Escape, of which the following is a full, clear, and exact description.

The object of the invention is to provide a new and improved portable water-tower, combined with an extension-ladder and fire-escape, to facilitate the extinguishing of fires and to provide an escape for persons in burning buildings, as well as an observatory for military and other purposes.

The invention consists of a water-tower made to be extended by means of telescoping pipes which carry ladders, the whole, when at place of operation, to be operated by hydraulic or pneumatic pressure or by chemical gas.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

The improvement is preferably mounted on a truck, A, of any approved construction, and adapted to be run quickly to a burning building either by horse or steam power. The truck A is provided with a flat platform, A', on which is mounted a ring, C, provided with two sections, C' C', hinged on the section $C^2$, secured by suitable means to the platform A'. In the middle of the hinged sections C' are secured the extension-legs $C^3$, of any approved construction, and adapted to rest on the ground when the hinged sections C' are raised to a level with the fixed sections $C^2$. The legs $C^3$ are made extensible, so as to level the sections C' when the legs $C^3$ rest on uneven ground.

Figure 2:
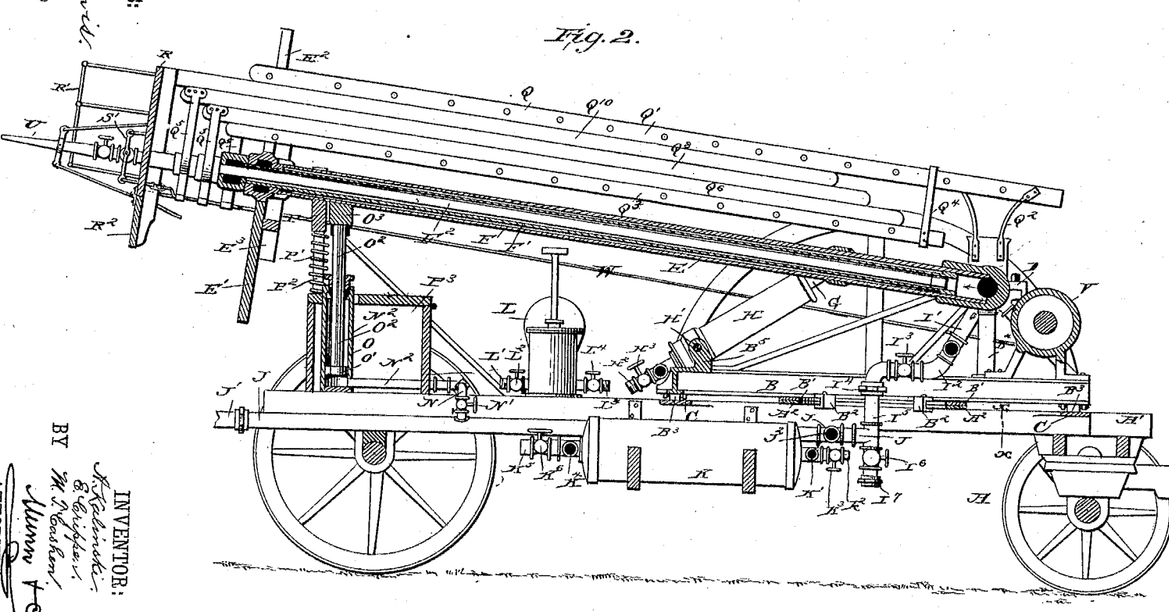
Fig. 2 is a longitudinal sectional elevation of the same.
Figure 3:
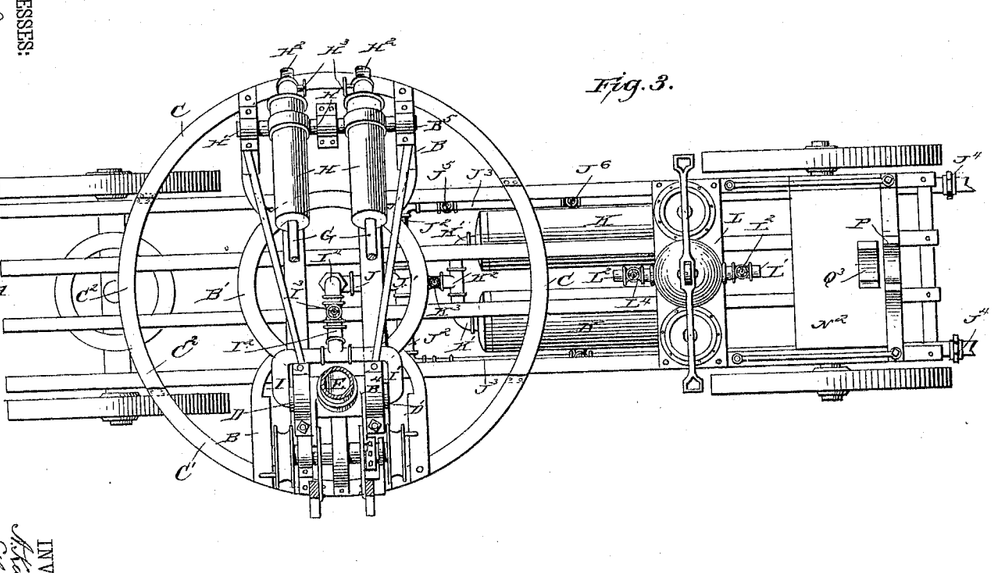
Fig. 3 is a plan view of the same with the water-tower and ladder removed.
Figure 4:
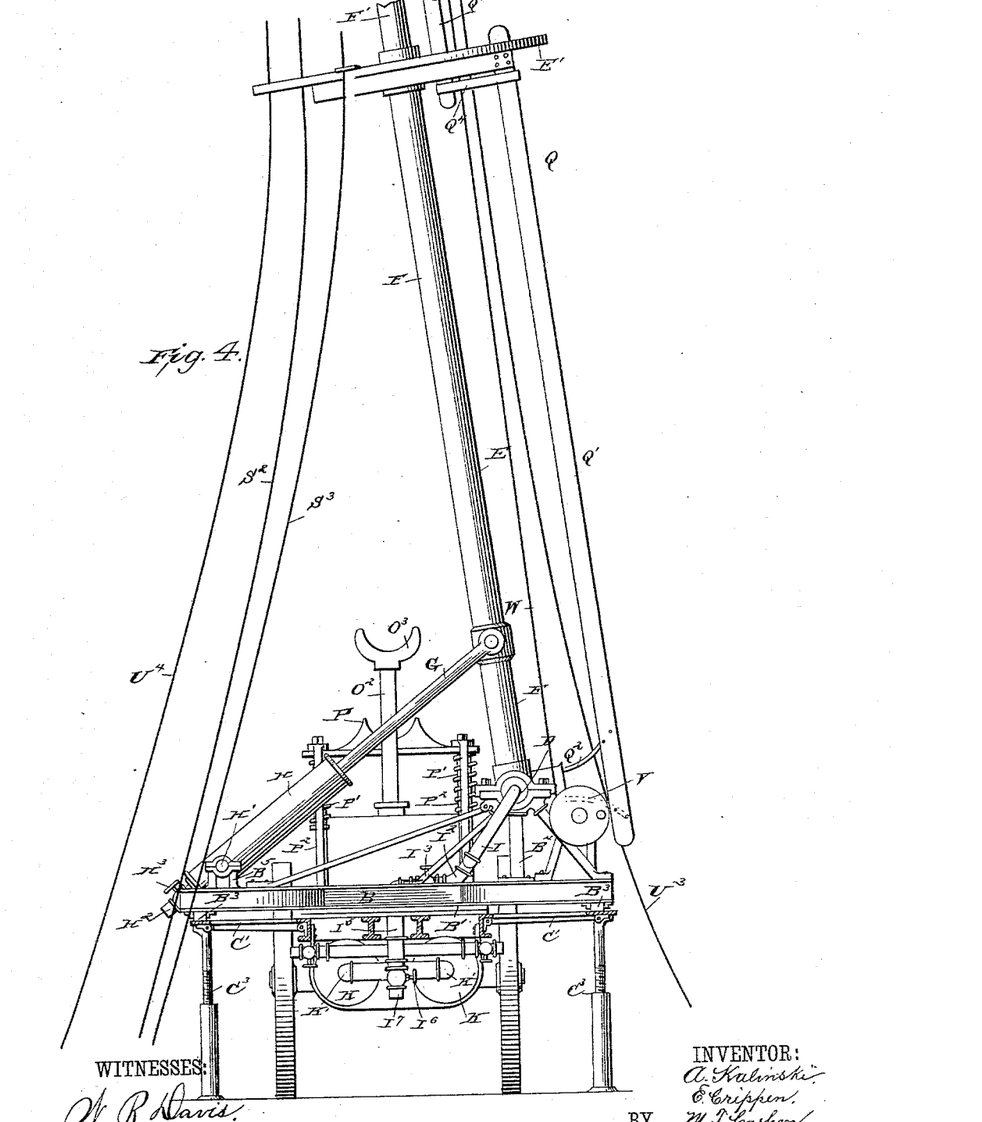
Fig. 4 is a sectional end elevation, on the line $x\ x$ of Fig. 2, of the improvement in an extended and raised position.
Figure 5:
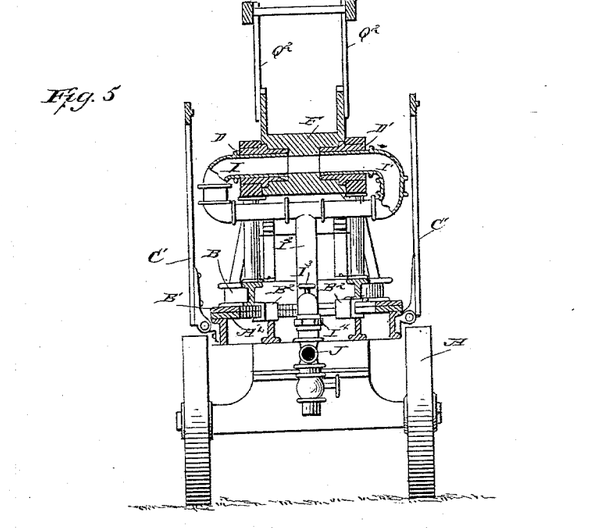
Fig. 5 is a sectional end elevation of part of the improvement on the line $y\ y$ of Fig. 1.
Figure 6:
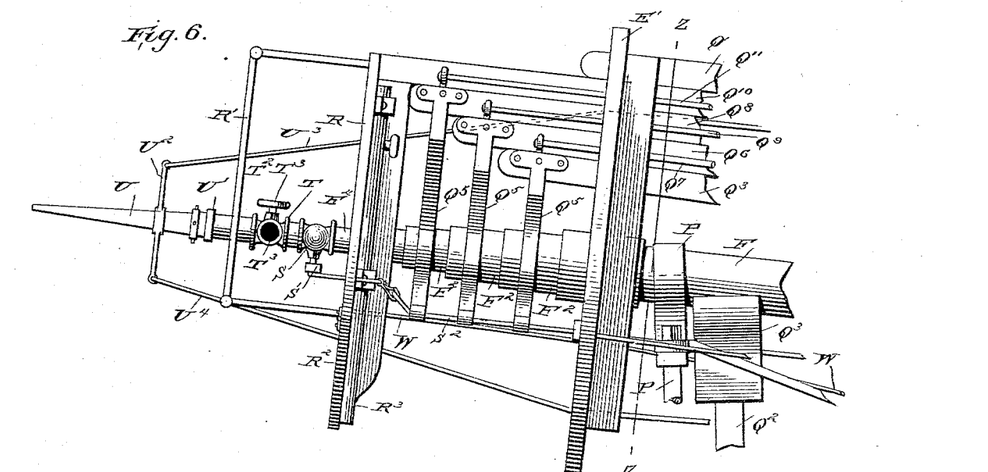
Fig. 6 is an enlarged side elevation of the upper end of the tower and ladder.
Figure 7:
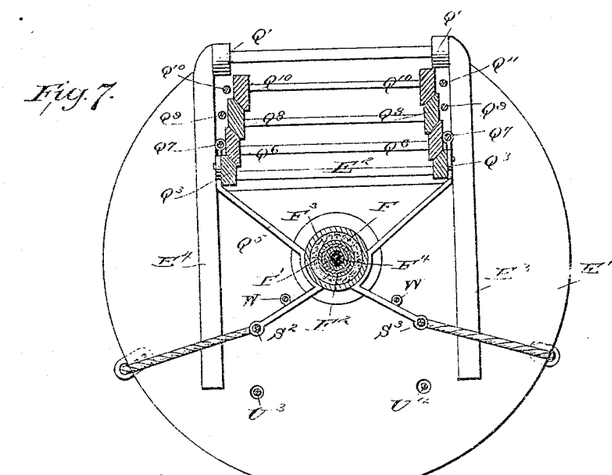
Fig. 7 is a sectional end elevation of the same on the line $z\ z$ of Fig. 6.

Concentric with the ring C is secured, on the platform A' of the truck A, a smaller ring, $A^2$, on which is placed, to turn, a ring, B', secured to the under side of a turn-table, B, on which the water-tower E is fulcrumed. Guide-blocks $B^2$ are secured to the ring B', and extend under the fixed ring $A^2$, so as to hold the turn-table or ring B' in place on the ring $A^2$ on the outer edge of the turn-table B, and at the bottom of the same are held the friction-rollers $B^3$, adapted to travel on the ring C when its several parts are extended in a level position, as shown in Figs. 2, 3, and 4. On one end of the turn-table B are formed the bearings $B^4$, on which are held the trunnions D, on which is fulcrumed the lower end of the exterior pipe, F, of the water-tower E, which is composed principally of the telescoping pipes F, F', $F^2$, $F^3$, and $F^4$, as shown in the drawings; but any number of such telescoping pipes may be employed. A combination of two towers, connected together by rounds, makes simply an extension-ladder turn-table truck. On the other end of the turn-table B is formed a bearing, $B^5$, in which fit the trunnions H', secured to cylinders H, in which operate pistons provided with the outwardly-extending piston-rods G, pivotally connected with the exterior pipe, F, of the water-tower E a short distance above the trunnions D. The lower end of each cylinder H is provided with a pipe, $H^2$, carrying a valve, $H^3$. This pipe $H^2$ is permanently connected by a hose or other means with the pipe $I^2$, hereinafter described, for furnishing a pressure against the pistons in the cylinders, H, so that the said pistons and their piston-rods G move outward, acting on the exterior pipe, F, and swinging the latter upward on its trunnions D. The exterior pipe, F, turns at its lower end on the hollow trunnions D, held in the said bearings $B^4$, and into the hollow trunnions D open the pipes I and I', connecting with the pipe $I^2$, provided with a valve, $I^3$, and with a coupling, $I^4$, which is held in the center of the turn-table B and the centers of the rings B' and C, so that when the turn-table B is turned to any desired position on the ring C said coupling $I^4$ is always in the center, and can, hence, be connected with the stationary pipe $I^5$, provided with a valve, $I^6$, and with a coupling, $I^7$, at its lower end, to which a hose from a fire-engine or other pump can be connected to force water under pressure, through the pipe $I^5$ into the pipe $I^2$ and into the hollow trunnions D, to the telescoping pipes F, F', $F^2$, $F^3$, and $F^4$, so that the pipes F', $F^2$, $F^3$, and $F^4$ are extended and moved outward from the exterior pipe, F.

From the pipe $I^5$ projects the pipe J, which opens a pipe, J', branching into the pipes $J^2$, extending at right angles to the outside of the truck-platform A', and then, bending rearwardly into the pipes $J^3$, extending in longitudinal line with the said platform A', and carrying at their outer ends the couplings $J^4$, adapted to be connected with the hose of several fire-engines, so as to force water into the extension-pipes F, F', $F^2$, $F^3$, and $F^4$ of the extended water-tower E. Along the pipes $J^3$ is arranged a number of valves, $J^5$, $J^6$, and $J^7$, to which additional hose of other fire-engines can be coupled, in case of need.

On the under side of the platform A is secured one or more cylinders, K, provided at their front ends with the pipes K', leading to a common pipe, $K^2$, provided with a valve, $K^3$, and adapted to be connected by a hose or other flexible tube with the coupling $I^7$ of the pipe $I^5$. The cylinders K may be charged with compressed air or chemicals for making gas, so that when the pipe $K^2$ is connected with the coupling $I^7$, as above described, and the valves $K^3$, $I^6$, and $I^3$ are opened, the force of the fluid under pressure contained in the cylinders K can be utilized to extend the closed telescoping pipes F', $F^2$, $F^3$, and $F^4$. This is done in case a pressure from a pump is not available to extend the pipes, as above described. The cylinders K are provided at their rear ends with inlet-pipes $K^4$, uniting in a common pipe, $K^5$, carrying the valve $K^6$ and adapted to be connected by hose with the pipe $L^3$ of the pump L, hereinafter described, or with other suitable means for charging said cylinders.

On top of the platform A' of the truck A, in the rear of the cylinders K, is placed a double-acting pump, L, provided with an inlet-pipe, L', having a valve, $L^2$, adapted to be connected with a source of water-supply by a hose or other flexible tube, so as to furnish water or air to the said pump. The outlet-pipe $L^3$ of the said pump L is also provided with a valve, $L^4$, and is adapted to be connected with the main pipe $J^3$, by flexible hose or other means, or with the pipe $K^5$, as above mentioned.

Figure 1:
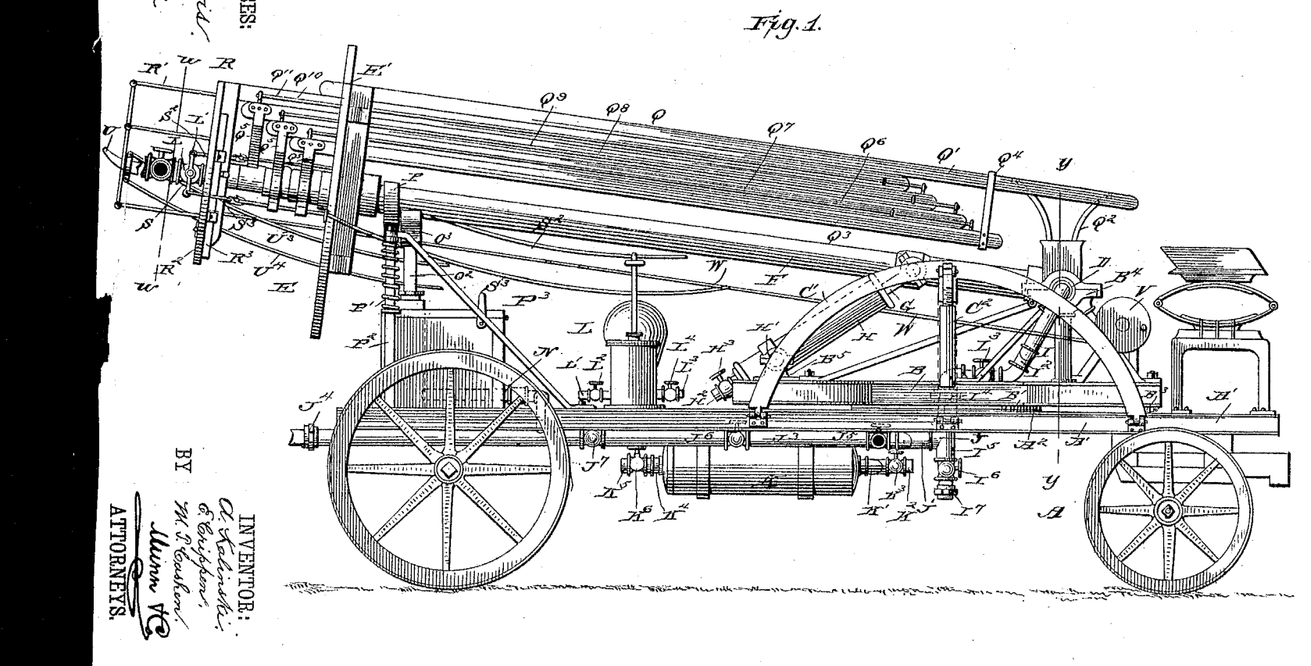
Figure 1 is a side elevation of the improvement as folded up.

With the longitudinally-extending pipes $J^3$ are connected the pipes N, each provided with a valve, N', and discharging into a common pipe, $N^2$, opening into a cylinder, O, supported on the rear end of the platform A', and in which operates a piston, O', carrying a piston-rod, $O^2$, provided on its outer end with a fork, $O^3$, into which fits the upper end of the exterior pipe, F, of the water-tower E. Next to the fork $O^3$ is a fork, P, on which rests the exterior pipe, F, when it is folded, as shown in Figs. 1 and 2, said fork P being supported on the springs P', coiled on the rods $P^2$, and secured by one end of the said rods. The latter are secured by their lower ends in a box, $P^3$, fastened on the platform A', and also inclosing the cylinder O, and serving to store tools and other implements used in connection with the machine. The springs P' make the fork P yielding, so that when the truck A is driven to a place over rough roads the water-tower E will not be injured. The cylinder O with its pistons O' and connections serve to lift the water-tower E from the fork P, thus assisting the cylinders H with their pistons and piston-rods G in raising the tower E.

On the upper end of the exterior pipe, F, of the water-tower E is secured a platform, E', provided in its top with a recess, $E^2$, from the sides of which extend the posts $E^3$ and $E^4$, on which is secured the upper end of a section, Q', of the extension-ladder Q, said section Q' being supported at its lower end by a bracket, $Q^2$, fastened on the fulcrumed end of the exterior pipe, F, so that when the latter is swung in position said bracket $Q^2$ turns with it. On the upper end of the extension-tube F' is secured an arm, $Q^5$, on which is fastened the upper end of the section $Q^3$ of the extension-ladder Q, said section $Q^3$ being supported at its lower end by an arm, $Q^4$, held to slide on the section Q', as shown in Figs. 1 and 2. On the upper end of the extension-tube $F^2$ is held a similar bracket, $Q^5$, on which is fastened the upper end of the section $Q^6$, resting on top of the section $Q^3$, and provided near its lower end with staples adapted to slide on rods $Q^7$, secured to the top of the said section $Q^3$. On the upper end of the extension-tube $F^3$ is secured a bracket, $Q^5$, which supports the upper end of the section $Q^8$ of the extension-ladder Q, and the said section $Q^8$ rests on the top of the section $Q^6$, and is provided with staples sliding on the rods $Q^9$, secured to the top of the said section $Q^6$. On the outer end of the last extension-tube $F^4$ is secured a platform, R, on which is fastened the upper end of the section $Q^{10}$ of the extension-ladder Q, said section $Q^{10}$ resting on the top of the section $Q^8$ and being guided by means of staples on rods $Q^{11}$ secured to the top of the said section $Q^8$. Thus it will be seen that the several sections of the extension-ladder Q are held in a folded position, one on top of the other, as is plainly shown in Figs. 1 and 2, and the several sections of the ladder are extended by the outward movement of the telescoping tubes F′, F², F³, and F⁴, as the said sections are connected by their upper ends to the outer ends of the said telescoping pipes.

The platform R is provided with a suitable railing, R′, and with a hinged part, R², which can be folded upon the said platform R, so that the latter presents a square edge which can be placed against the building, thus steadying the entire extended water-tower E. On the under side of the platform R are held, to slide, the beams R³, which can be moved outward beyond the platform R and placed on the sill of a window so as to steady the upper extended end of the water-tower E, and at the same time establish communication between the platform R and the burning building by means of the said window.

On the upper end of the central telescoping pipe F⁴ is held a pipe, T, having a T, T′, which can establish communication with the sidewise-extending pipes T², each having a valve, T³, on which may be coupled hose for carrying water through a building or across the tops of houses, as desired. In the pipe T is also held a valve, S, provided on its valve-stem with an arm, S′, on the outer ends of which are secured ropes S² and S³, and which extend down to the ground and are worked on independent drums or hung on hooks, and serve to open and close said valve S from the ground. On the upper end of the pipe T is held a flexible nozzle, U, coupled in the usual manner by the coupling U′ to the said pipe T, and provided with an arm, U², on the outer ends of which are secured ropes U³ and U⁴, passing through suitable bearings on the platforms R and E′ down to the ground and serving to bend said nozzle so as to direct a stream of water to any desired place. To the lower side of the platform R are attached the ropes W, which extend downward to the table B. The lower ends of the ropes W are wound, when the tower is not extended, on a drum, V, mounted in the front end of the turn-table B. The drum V is secured on a shaft provided with a friction-brake and an automatic clutch to regulate the length or height of the tower at the will of the operator.

Figure 8:
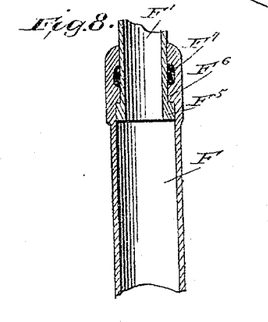
Fig. 8 is an enlarged sectional elevation of part of the water-tower, showing the two extension-tubes in their outermost position.
Figure 9:
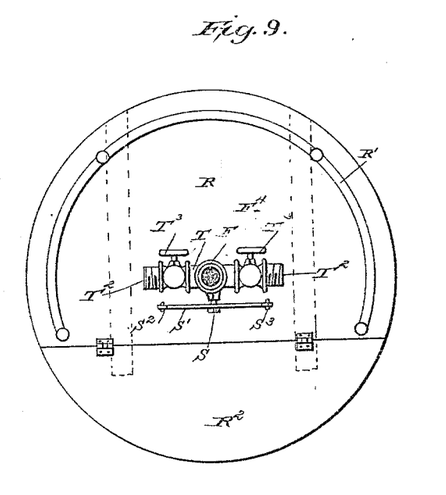
Fig. 9 is a sectional plan view of part of the improvement on the line $w\ w$ of Fig. 1.

Each of the extension-pipes F′, F², F³, and F⁴ is provided at its lower end with a collar, F⁵, which fits into its corresponding pipe, and is adapted to engage a lug, F⁶, at the upper end of the said pipe in which it fits, so that when one of the pipes is extended to its full length said collar F⁵ rests against the shoulder F⁶, and is thus prevented from slipping out of the pipe in which it slides. Each of the pipes is also provided with a suitable packing, F⁷, so as to prevent leakage of water at the ends of each section, as is plainly shown in Fig. 8.

The operation is as follows: The apparatus, as shown in Figs. 1 and 2, is in a folded position on the track A, and can be carried by the latter to a burning building, and then the water-tower E can be erected and extended to any desired height, at the same time extending the several sections of the extensible ladder Q. This is accomplished in the following manner: As soon as the truck A has arrived at the desired place in the neighborhood of the burning building, the hose of the fire-engine is coupled to the couplings J⁴ or to the coupling I′, so that by opening the cocks N′ water under pressure flows into the cylinder O and raises the piston O′, whereby the fork O³, held on the piston-rod O², lifts the water-tower E a short distance, and then water or fluid or chemical gas under pressure is admitted into the cylinders H by opening the cocks H³, the pipes H² being permanently connected by a hose with the pipe I² for supplying water under pressure. The pistons in the cylinders H are forced outward, so that the piston-rods G, acting on the exterior pipe, F, of the water-tower E, raise the latter to a perpendicular position, as shown in Fig. 4. The valves I⁶ and I³ are now open, so that water flows into the trunnions D, and from the latter into the telescoping pipes F, F′, F², F³, and F⁴, so that the said telescoping pipes are extended until the collars F⁵ abut against the respective shoulders F⁶, thus stopping the outward motion of the said telescoping pipes, or the extension of the tower can be regulated by the ropes W and drum. The water-tower E is now in an extended position, and the extension-ladder Q is similarly extended, as the several sections of the ladder Q are raised to form one continuous ladder by the outward movement of the several extension-pipes F′, F², F³, and F⁴.

It is understood that the several arms Q⁵, connected with the outer ends of the several telescoping pipes F′, F², and F³, pull on the upper ends of the sections Q³, Q⁶, and Q⁸, and the platform R, held on the outer end of the extension-pipe F⁴, causes the section Q¹⁰ of the ladder Q to slide outward in the same manner as the arms Q⁵ cause a movement of the sections Q³, Q⁶, and Q⁸. The several sections Q⁶, Q⁸, and Q¹⁰ are guided in their outward movement by the rods Q⁷, Q⁹, and Q¹¹, and the respective staples secured on the sections. When the tower E and the extension-ladder Q are extended, as described, a continuous ladder is formed from the truck A, so that firemen are enabled to run up the extension-ladder Q onto the platform R, from which they can direct the nozzle U to parts of the burning building. When the water-tower E and the extension-ladder Q are extended, they can be turned to any desired position by turning the turn-table B, so as to assume, for instance, the position shown in Figs. 3 and 4—that is, the turn-table B stands at right angles to the longitudinal line of the truck A.

When the water-tower E and the ladder Q are in the positions shown in Fig. 4, the valves H³ are closed, so that the water remains in the cylinders H and forms a cushion for the pistons and the piston-rods G, whereby the water-tower E is held in its position. A stream of water can now be forced through the pipes I⁵ and I² into the trunnions D and through the extended pipes F, F', F², F³, and F⁴, so that it finally reaches the nozzle U, which can be directed either from the ground, by means of the ropes U³ and U⁴, to any desired place, or firemen, standing on the platform R, may direct the nozzle to any desired place. The water passing up to the nozzle U can be shut off at any desired time by operating the valve T' from the top platform, R, or from the ground by operating the ropes S² and S³, so that the arm S' of the valve is swung to one side either by opening or closing the valve.

In case a fire-engine is not at hand, the pump L is brought into use by connecting the inlet-pipe L with a suitable source of water-supply and then operating the pump by hand in the usual manner, so that a stream of water is forced through the exhaust-pipe L³, which is first connected with the pipe H² to raise the water-tower E into a perpendicular position, after which the valve H³ is closed, and then the pipe L³ is connected with the coupling I⁷, so as to force a continuous stream of water into the extension-pipes F, F', F², F³, and F⁴, so that the latter are extended, as above described, and then the valve S is opened, so that the stream of water can pass out through the nozzle U. In a like manner the water-tower E can be raised into a perpendicular position by opening valves K³ and H³, and as the pipe K is permanently connected with the main pipe J³, a fluid, under pressure from compressed air obtained by the hand-pump L or by the chemicals in cylinders K, is admitted into the cylinders H, whereby the pistons in the cylinders are forced outward and the piston-rods C swing the water-tower E into a perpendicular position.

The extended water-tower E and ladder Q can be brought back to their original folded position by disconnecting the source of supply from the pipe I⁵ and opening the valve L⁶, so that the water can flow out through the coupling L⁷, whereby the several extension-pipes telescope into each other—that is, move downward—and thereby the several sections of the extension-ladder move in the same direction until all the sections are in the pipe F, as shown in Figs. 1 and 2. When the turn-table B is swung into a longitudinal line with the truck A, the valve H³ is opened, so as to permit the fluid under pressure or air contained in the cylinders H to escape through the said pipe H². The weight of the water-tower E and the ladder Q presses against the piston-rods G, thereby forcing their pistons in the cylinders H downward until the exterior pipe, F, again rests in the yielding fork P, as shown in Figs. 1 and 2. The ropes W are at the same time wound up on the drum V, so that the several parts are all in a folded position.

The ropes S² S³ and U³ U⁴ are coiled or wound upon separate drums. It is understood that the said ropes W are the controlling-ropes, which serve to regulate the length or height of the tower E when the same is extended and held under pressure.

Having thus described our invention, what we claim as new, and desire to secure by Letters Patent, is—

1. The combination, with telescoping pipes forming a water-tower, of hollow fixed trunnions on which one end of the exterior one of the said telescoping pipes is pivoted, piston-rods pivotally connected with the exterior one of the said telescoping pipes, cylinders containing pistons connected with the said piston-rods, trunnions on which the said cylinders are mounted to swing, and cylinders or tanks charged with a fluid under pressure or chemicals for creating gas, and adapted to be connected with the said cylinders, substantially as shown and described.

2. The combination, with telescoping pipes forming a water-tower, of hollow fixed trunnions on which is pivoted one end of the exterior one of the said telescoping pipes, and pipes provided with valves connected with the said hollow trunnions, substantially as shown and described.

3. The combination, with telescoping pipes forming a water-tower, of hollow fixed trunnions on which is pivoted one end of the exterior one of the said telescoping pipes, piston-rods pivotally connected with the lower end of the exterior one of the said telescoping pipes, cylinders mounted to swing and containing pistons connected with the said piston-rods, pipes provided with valves connected with the said fixed trunnions, and a turn-table on which the said trunnions and the said cylinders are mounted, substantially as shown and described.

4. The combination, with a truck provided with a platform, of a central ring secured on the said platform, an outer ring held concentric with the said central ring and provided with two hinged parts, extension-legs held on the said hinged parts of the exterior ring, and a turn-table mounted to turn on the said concentric rings, substantially as shown and described.

5. The combination, with a truck supporting at its front end two concentric rings and at its rear end a yielding fork, of a turn-table mounted to turn on the said concentric rings, fixed hollow trunnions held on the said turn-table, pipes leading to the said hollow trunnions from the centers of the said concentric rings, telescoping pipes forming a water-tower, of which pipes the exterior one is secured at its lower end on the said trunnions, its upper end resting on the said yielding fork, and an extension-ladder made in sections supported on the said telescoping pipes, substantially as shown and described.

6. The combination, with a truck supporting at its front end two concentric rings and at its rear end a yielding fork, of a turn-table mounted on the said concentric rings, fixed hollow trunnions held on the said turn-table, pipes leading to the said hollow trunnions from the centers of the said concentric rings, telescoping pipes forming a water-tower, of which pipes the exterior one is secured at its lower end on the said trunnions, its upper end resting on the said yielding fork, an extension-ladder made in sections supported on the said telescoping pipes, piston-rods pivotally connected with the exterior one of the said telescoping pipes, and a cylinder mounted to swing on the said turn-table and containing pistons connected with the said piston-rods, substantially as shown and described.

7. The combination, with a truck provided in its front with two concentric rings and at its rear with a yielding fork, of a turn-table held to turn on the said concentric rings, hollow trunnions held on the said turn-table, pipes connected with the said hollow trunnions and extending to the centers of the said concentric rings, telescoping pipes forming a water-tower, and of which pipes the exterior one is fulcrumed on the said trunnions, the upper end of the said exterior pipe resting in the yielding fork, a second fork engaging the upper end of the said exterior pipe, a piston-rod connected with the said second fork and carrying a piston, a cylinder in which operates the said piston, said cylinder being connected by a pipe with a source for supplying a liquid or gas under pressure, substantially as shown and described.

8. Telescoping pipes, of which the exterior one has its lower end fulcrumed, platforms held at the upper ends of the said exterior and the central telescoping pipes, arms secured to the outer ends of the said telescoping pipes, an extension-ladder made in sections supported at their upper ends on the said platforms and the said arms, brackets formed on the fulcrumed end of the said exterior pipe and supporting one of the sections, and an arm secured to the end of the next to lowermost section and sliding on the lowermost section of the said ladder, substantially as shown and described.

9. Telescoping pipes, of which the exterior one has its lower end fulcrumed, platforms held at the upper ends of the said exterior and the central telescoping pipes, arms secured to the outer ends of the said telescoping pipes, an extension-ladder made in sections supported at their upper ends on the said platforms and the said arms, brackets formed on the fulcrumed end of the said exterior pipe and supporting one of the sections, an arm secured to the lowermost section and through which the uppermost section of the said ladder freely passes, staples secured to the sections of the said ladder, and guide-rods passing through the said staples and secured to the succeeding section of the ladder, substantially as shown and described.

10. The combination, with telescoping tubes forming a water-tower, of a T held on the upper end of the central telescoping tube, a valve held on the said T, and a nozzle extending from the said T in such a manner that the said valve controls the outflow of the said T and the said nozzle, substantially as shown and described.

11. The combination, with telescoping tubes forming a water-tower, of a platform held at the outer end of the central telescoping tube, said platform being provided with a hinged part adapted to be folded upon the said platform, and beams held to slide on the under side of the said platform, substantially as shown and described.

ACHILLES KALINSKI.
EDWIN CRIPPEN.
MARCUS T. CASHEN.

Witnesses:
J. H. FERGUSON,
JOSEPH SCHWARTZ.